(12) United States Patent
Itou et al.

(10) Patent No.: US 11,480,243 B2
(45) Date of Patent: Oct. 25, 2022

(54) DRIVING FORCE TRANSMISSION APPARATUS

(71) Applicants: JATCO Ltd, Fuji (JP); NISSAN MOTOR CO., LTD., Yokohama (JP)

(72) Inventors: Tsutomu Itou, Fujinomiya (JP); Dai Sugiyama, Fuji (JP); Satoru Naruoka, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/971,942

(22) PCT Filed: Jan. 10, 2019

(86) PCT No.: PCT/JP2019/000423
§ 371 (c)(1),
(2) Date: Aug. 21, 2020

(87) PCT Pub. No.: WO2019/163316
PCT Pub. Date: Aug. 29, 2019

(65) Prior Publication Data
US 2020/0393037 A1  Dec. 17, 2020

(30) Foreign Application Priority Data
Feb. 26, 2018  (JP) .............................. JP2018-032079

(51) Int. Cl.
*F16H 57/02* (2012.01)
*F16H 57/03* (2012.01)
(Continued)

(52) U.S. Cl.
CPC ........... *F16H 57/03* (2013.01); *F16H 57/028* (2013.01); *F16H 57/031* (2013.01); *F16H 57/0441* (2013.01)

(58) Field of Classification Search
CPC ........ F16H 57/02; F16H 57/03; F16H 57/031; F16H 57/0434; F16H 57/0441; F16H 57/028
See application file for complete search history.

(56) References Cited

U.S. PATENT DOCUMENTS 2,263,092 A * 11/1941 Johnson .............. F16H 57/0421
184/6.12
3,799,000 A *  3/1974 Piret ...................... F16H 37/08
475/71

(Continued)

FOREIGN PATENT DOCUMENTS

JP         59151651 A  *  8/1984
JP       H04-113062 A     4/1992
(Continued)

*Primary Examiner* — Adam D Rogers
(74) *Attorney, Agent, or Firm* — Foley & Lardner LLP (57) ABSTRACT

The continuously variable transmission includes a transmission case having a side cover, a housing, and a case sandwiched between the side cover and the housing, an oil pump disposed in the transmission case, and a pair of gears disposed in the transmission case. An axial rib having a linear shape extending from the side cover toward the housing is formed on an outer wall surface of the case at a position adjacent to the pair of gears. The axial rib is positioned on a straight line extending from the oil pump in the vertical direction and is locally positioned at a position where the meshing reaction force of the pair of gears is suppressed.

11 Claims, 5 Drawing Sheets

(51) Int. Cl.
  *F16H 57/031* (2012.01)
  *F16H 57/028* (2012.01)
  *F16H 57/04* (2010.01)

(56) References Cited

U.S. PATENT DOCUMENTS

| | | | | |
|---|---|---|---|---|
| 9,878,605 | B2* | 1/2018 | Inoue | B60L 15/2054 |
| 10,465,789 | B2* | 11/2019 | Uesugi | F16H 57/04 |
| 10,598,268 | B2* | 3/2020 | Nakajima | F16H 57/025 |
| 11,261,955 | B2* | 3/2022 | Döring | F16H 57/021 |
| 2014/0245860 | A1* | 9/2014 | Kimura | B60K 1/00 |
| | | | | 74/606 R |
| 2018/0163847 | A1* | 6/2018 | Ahn | F16H 57/0423 |

FOREIGN PATENT DOCUMENTS

| | | | | |
|---|---|---|---|---|
| JP | 2015045355 A | * | 3/2015 | |
| JP | 2017096385 A | * | 6/2017 | F16H 57/031 |
| WO | WO-2017022726 A1 | * | 2/2017 | F16H 57/03 |

\* cited by examiner

SECTION A

FIG. 4B

SECTION B-B

FIG. 4C

SECTION C-C

FIG. 4D

SECTION D-D

PRIOR ART

SECTION A
PRIOR ART

DRIVING FORCE TRANSMISSION APPARATUS

TECHNICAL FIELD

The present invention relates to a driving force transmission apparatus.

BACKGROUND ART

Patent Document 1 discloses a configuration in which a grid-like rib is provided over the entire surface of the outer wall of the transmission case.

However, if a grid-like rib is provided over the entire surface of the outer wall, the transmission case weighs more.

It is required to provide a rib construction designed by considering weight reduction.

PRIOR ART DOCUMENTS

Patent Document

Patent Document 1:JP4-113062A

SUMMARY OF INVENTION

An aspect of the present invention provides a driving force transmission apparatus including:

a case having a first case member, a second case member and a third case member sandwiched between the first case member and the second case member, an oil pump disposed in the case, and a pair of gears disposed in the case, wherein a rib having a linear shape extending from the first case member toward the second case member is formed on an outer wall surface of the third case member at a position adjacent to the pair of gears, the rib is disposed on a straight line extending from the oil pump in a vertical direction and is locally disposed at a position where a meshing reaction force of the pair of gears is suppressed, the rib has a shape connecting both of the first fastening point between the first case member and the third case member and the second fastening point between the second case member and the third case member, and a top surface of the rib is positioned at a position higher than a center point of a fixing hole at the first fastening point and a center point of a fixing hole at the second fastening point.

According to the aspect of the present invention, a rib structure designed by considering weight reduction can be provided.

DESCRIPTION OF EMBODIMENTS

Hereinafter, an embodiment of the present invention will be described with reference to FIGS. 1 to 4E, referring to the case where the driving force transmission apparatus is a belt continuously variable transmission 200 for a vehicle.

Figure 1:
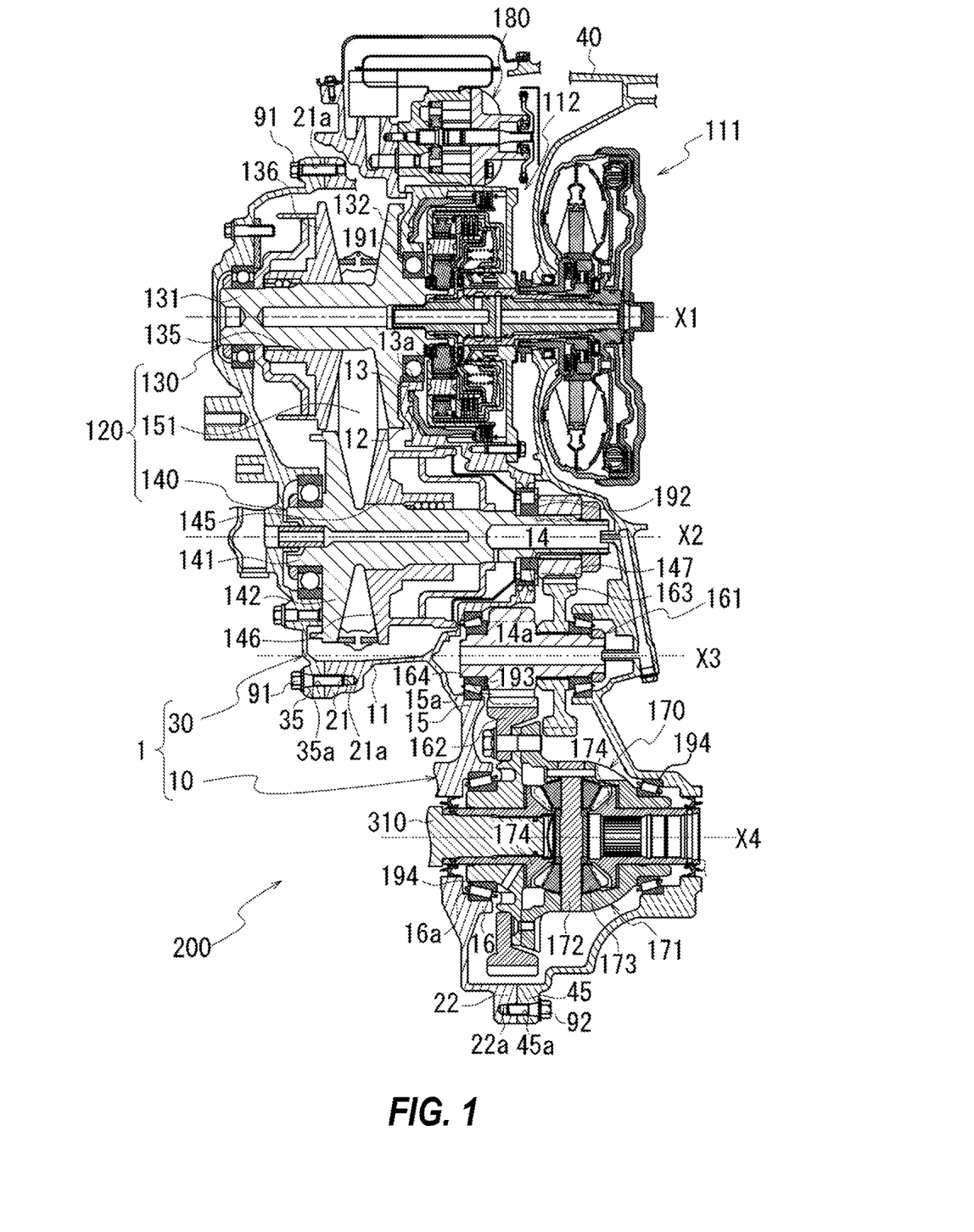
FIG. 1 is a diagram illustrating a belt continuously variable transmission.

FIG. 1 is a diagram illustrating the belt continuously variable transmission 200.

In FIG. 1, the transmission path of a rotational driving force transmitted through the respective rotation transmission shafts (first shaft, second shaft, third shaft, and fourth shaft) is schematically shown within a range from a torque converter 111 through a variator 120 to a differential device 170.

Figure 2A:
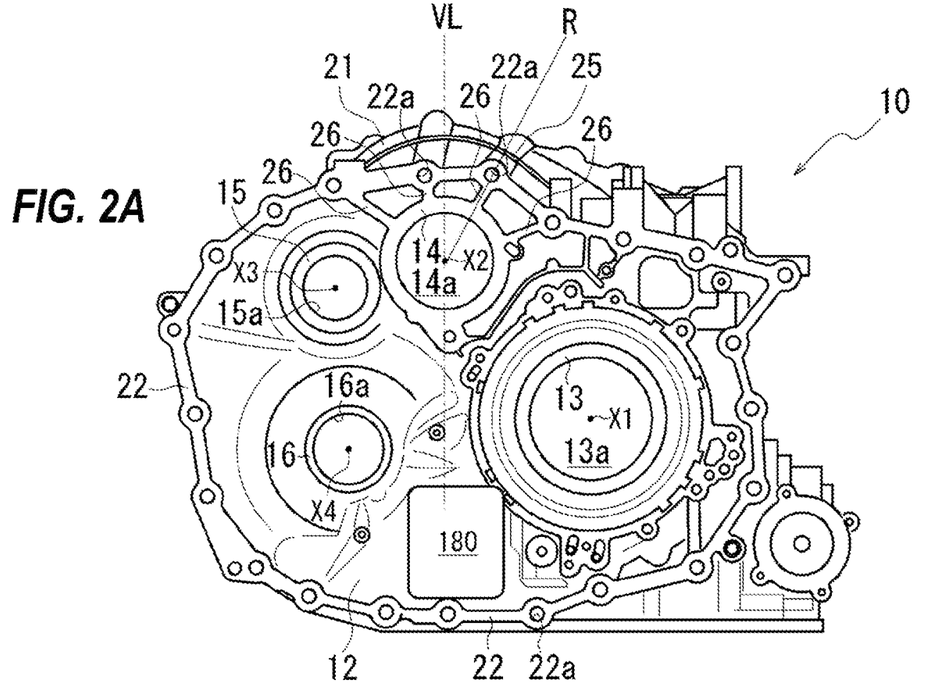
FIGS. 2A, 2B are diagrams illustrating a case constituting a transmission case.
Figure 2B:
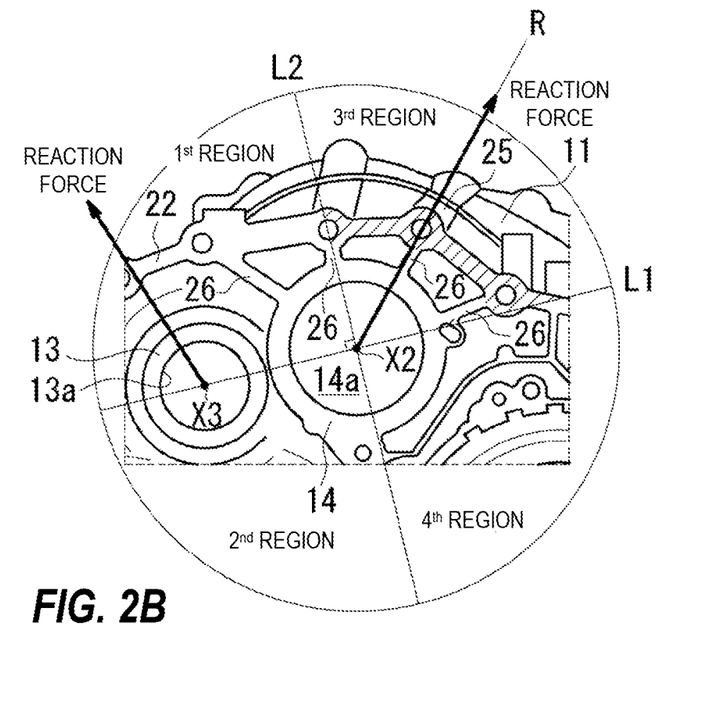

FIGS. 2A, 2B are diagrams illustrating a case 10. FIG. 2A is a view of the case 10 seen from a housing 40. FIG. 2B is an enlarged view of the periphery of a through hole 14a provided on the case 10. In FIG. 2A, an oil pump 180 is schematically shown.

As shown in FIG. 1, the continuously variable transmission 200 continuously changes a rotational driving force output from an engine (not shown) and transmits it to driving wheels.

The continuously variable transmission 200 includes the torque converter 111 into which the rotational driving force is input from the engine, a forward/reverse switching mechanism 112, the variator 120, a reduction gear 161, the differential device 170, the oil pump 180, and a transmission case 1 which houses them.

The forward/reverse switching mechanism 112 includes planetary gear mechanisms. The forward/reverse switching mechanism 112 inputs the rotational driving force output from the torque converter 111 to the variator 120 in forward rotation/reverse rotation.

The torque converter 111, the forward/reverse switching mechanism 112, and a primary pulley 130 of the variator 120 rotate about an axis line X1 (first shaft).

A secondary pulley 140 of the variator 120 rotates about an axis line X2 (second shaft). The reduction gear 161 rotates about an axis line X3 (third shaft). The differential device 170 rotates about an axis line X4 (fourth shaft).

The axis line X1, the axis line X2, the axis line X3, and the axis line X4 are arranged parallel to each other.

As shown in FIG. 2A, the axis line X2 and the axis line X3 are arranged at substantially the same height in a vertical direction based on the installed state of the continuously variable transmission 200. The axis line X4 is disposed substantially vertically below the axis line X3. The axis line X1 is disposed at substantially the same height as the axis line X4 and obliquely below the axis line X2.

As shown in FIG. 1, the variator 120 is a belt-CVT (Continuously Variable Transmission). The variator 120 includes the primary pulley 130 provided on the input side, the secondary pulley 140 provided on the output side, and a belt 151 wrapped around the primary pulley 130 and the secondary pulley 140 to transmit the rotational driving force.

The primary pulley 130 includes a fixed pulley 131 which is axially non-displaceable and a movable pulley 135 which is axially displaceable relative to the fixed pulley 131.

The fixed pulley 131 is rotatably supported on the case 10 via a ball bearing 191. The fixed pulley 131 receives the output rotation of the forward/reverse switching mechanism 112.

Between a sheave portion 132 of the fixed pulley 131 and a sheave portion 136 of the movable pulley 135, a V groove on which the belt 151 is wound is formed. When the movable pulley 135 is displaced relative to the fixed pulley 131 corresponding to an oil pressure, the width of the V groove changes. Consequently, the winding radius of the belt 151 on the primary pulley 130 changes.

The secondary pulley 140 includes a fixed pulley 141 which is axially non-displaceable and a movable pulley 145 which is axially displaceable relative to the fixed pulley 141.

The housing 40 side of the fixed pulley 141 (the right side in FIG. 1) is rotatably supported on the case 10 via a roller bearing 192.

Between a sheave portion 142 of the fixed pulley 141 and a sheave portion 146 of the movable pulley 145, a V groove on which the belt 151 is wound is formed. When the movable pulley 145 is displaced relative to the fixed pulley 141 corresponding to an oil pressure, the width of the V groove changes. Consequently, the winding radius of the belt 151 on the secondary pulley 140 changes.

By changing the winding radius of the belt 151 on the primary pulley 130 and the winding radius of the belt 151 on the secondary pulley 140, respectively, the driving force from the primary pulley 130 is changed and transmitted to the secondary pulley 140.

A gear 147 spline fits to the housing 40 side of the fixed pulley 141. The gear 147 meshes a gear 163 on the reduction gear 161 side.

The reduction gear 161 constitutes a gear mechanism that transfers the rotation of the fixed pulley 141 to the differential device 170.

A side cover 30 side of the reduction gear 161 (the left side in the FIG. 1) is rotatably supported on the case 10 via a tapered roller bearing 193.

The gear 163 spline fits to the housing 40 side (right side in FIG. 1) of the reduction gear 161.

The gear 163 meshes the gear 147 on the secondary pulley 140 side mentioned above. The gear 147 and the gear 163 constitute a pair of gears involved in the transmission of the rotational driving force between the secondary pulley 140 and the reduction gear 161.

A meshing reaction force acts on the gears 147 and 163 when the rotational driving force is transmitted. The direction in which the meshing reaction force acts is a direction to displace the gear 147 and the gear 163 in a direction away from each other (direction to separate).

In the reduction gear 161, a gear portion 164 is provided on the side cover 30 side. The gear portion 164 meshes the final gear 162 fixed on the differential case 171 of the differential device 170.

The differential device 170 transmits the rotational driving force transmitted through the final gear 162 to the left and right driving wheels (not shown) and differentially rotates the left and right driving wheels.

The differential device 170 includes the differential case 171 in a spherical shape, a pinion shaft 172 fixed on the differential case 171, a pair of pinion gears 173 rotating about the pinion shaft 172, and a pair of side gears 174 mesh with the pinion gears 173.

The side gears 174 spline fit to drive shafts 310 that rotate integrally with the driving wheels. In FIG. 1, the drive shaft 310 on the right side in the figure is not shown.

The differential case 171 is rotatably supported on the case 10 via the tapered roller bearing 194.

Figure 3:
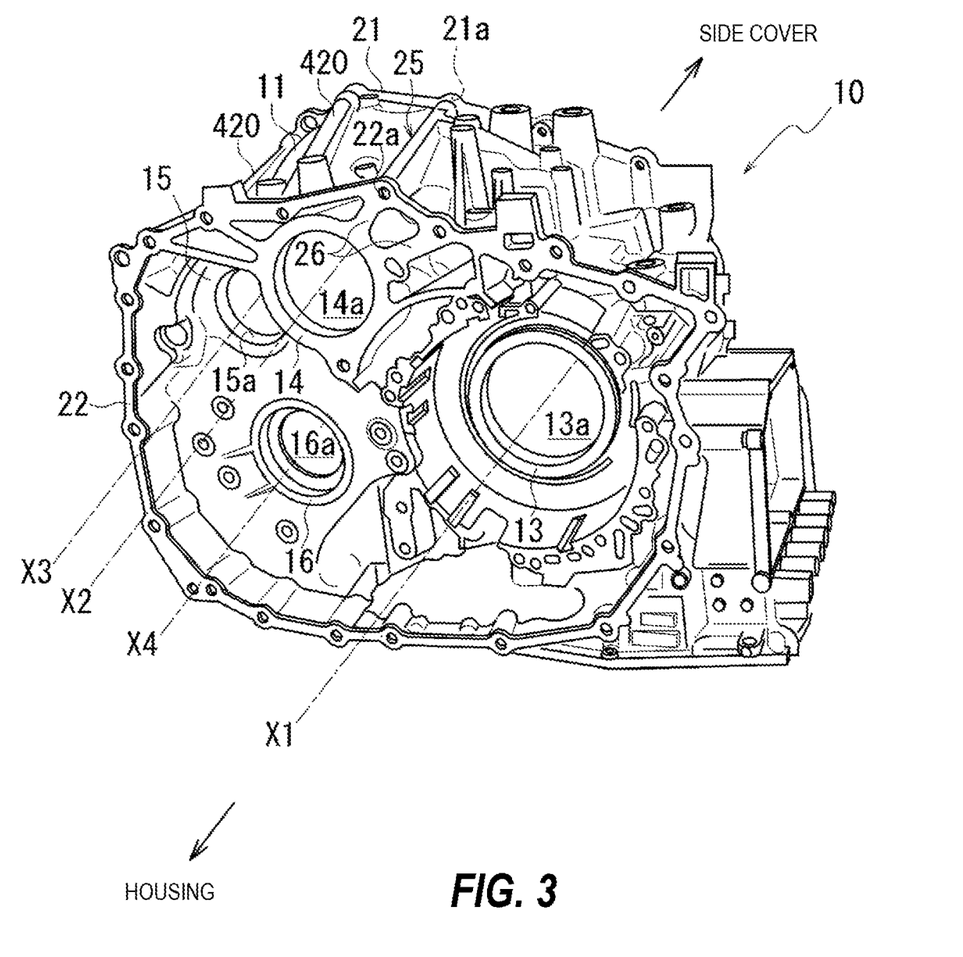
FIG. 3 is a perspective view of the case constituting the transmission case viewed from a housing.

FIG. 3 is a perspective view of the case 10 seen from the housing 40 and obliquely from above.

Figure 4A:
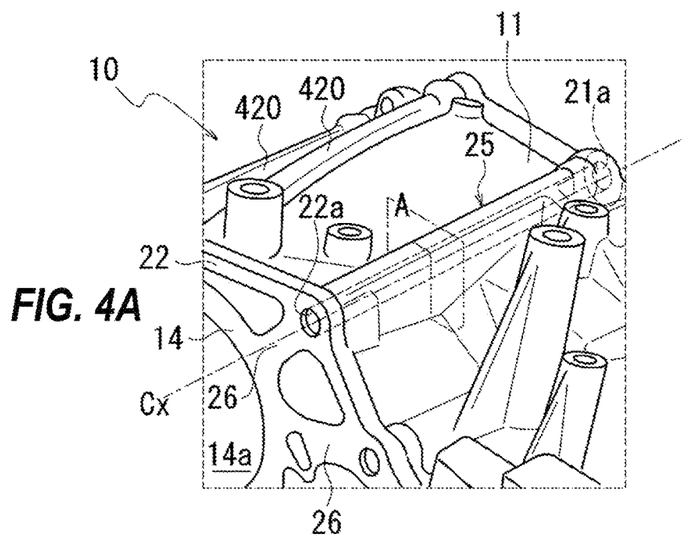
FIGS. 4A-4E are diagrams illustrating an axial direction rib provided on the case.
Figure 4B:
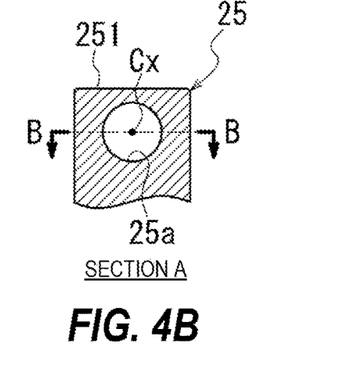
Figure 4C:
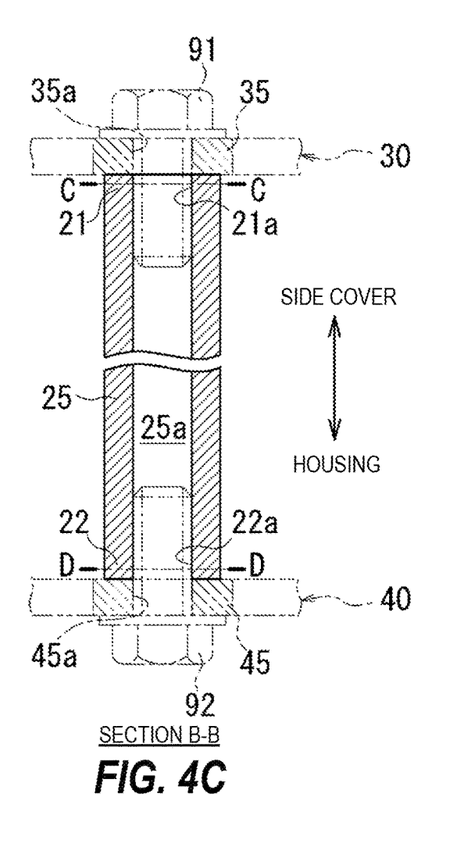
Figure 4D:
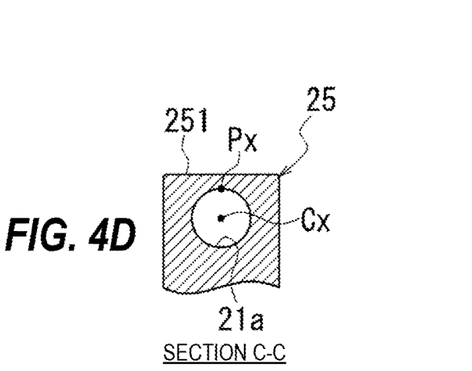
Figure 4E:
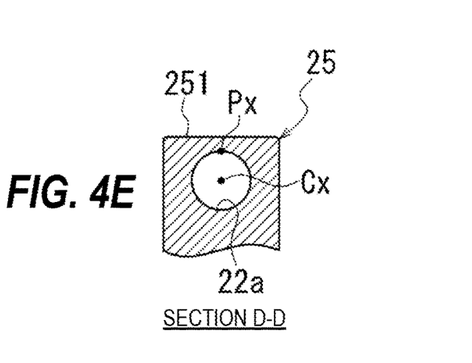

FIGS. 4A-4E are diagrams illustrating an axial rib 25 (reinforcing rib) provided on the case 10. FIG. 4A is a perspective view showing an enlarged axial rib 25 on the case 10. FIG. 4B is a cross-sectional view obtained by cutting the axial rib 25 in a plane A in FIG. 4A. FIG. 4C is a cross-sectional view obtained by cutting the axial rib 25 along the line B-B in FIG. 4B. FIG. 4D is a cross-sectional view obtained by cutting the axial rib 25 along the line C-C in FIG. 4C. FIG. 4E is a cross-sectional view obtained by cutting the axial rib 25 along the D-D line in FIG. 4C.

In FIG. 4C, the housing 40 and the side cover 30 to be assembled to the case 10 are shown by imaginary lines together with bolts 91 and 92.

As shown in FIG. 1, the transmission case 1 is a box body divided into three pieces. The transmission case 1 includes the case 10 (third case member), the side cover 30 (first case member), and the housing 40 (second case member).

Specifically, the side cover 30 and the housing 40 sandwich the case 10 in the axial direction.

The case 10 is generally a thin cylindrical body in the axial direction. The case 10 accommodates therein the variator 120 and the like. The case 10 includes a cylindrical outer circumference wall portion 11 which generally constitutes the outer shell, and an intermediate wall portion 12 which extends inwardly from the outer circumference wall portion 11 and generally partitions in the axial direction. A through hole 13a, the through hole 14a, a through hole 15a and a through hole 16a which axially penetrate the intermediate wall portion 12 are formed on the intermediate wall portion 12.

As shown in FIG. 2A, the through hole 13a is formed around the axis line X1. A cylindrical support wall portion 13 surrounding the through hole 13a is formed on the intermediate wall portion 12.

The support wall portion 13 out fits on the ball bearing 191 (see FIG. 1) to support the ball bearing 191.

The through hole 14a is formed around the axis line X2. A cylindrical support wall portion 14 surrounding the through hole 14a is formed on the intermediate wall portion 12.

The support wall portion 14 out fits on the roller bearing 192 (see FIG. 1) to support the roller bearing 192.

The through hole 15a is formed around the axis line X3. A cylindrical support wall portion 15 surrounding the through hole 15a is formed on the intermediate wall portion 12.

The support wall portion 15 out fits on the tapered roller bearing 193 (see FIG. 1) to support the tapered roller bearing 193.

The through hole 16a is formed around the axis line X4. A cylindrical support wall portion 16 surrounding the through hole 16a is formed on the intermediate wall portion 12.

The support wall portion 15 out fits on the tapered roller bearing 194 (see FIG. 1) to support the tapered roller bearing 194.

As shown in FIG. 1, the surface on the side cover 30 side of the case 10 has a joining portion 21 joined with the side cover 30. When viewed from the side cover 30, the joining portion 21 is formed in an annular shape surrounding the variator 120. The variator 120 is accommodated inside the annular joining portion 21.

Bolt holes 21a (first fastening point) are formed on the joining portion 21. The plurality of bolt holes 21a are provided at intervals in the circumferential direction. A bolt 91 penetrating the peripheral portion 35 of the side cover 30 is screwed into each of the bolt holes 21a.

The side cover 30 is fixed to the joining portion 21 by the bolts 91 to seal the opening of the annular joining portion 21.

As shown in FIG. 2A, on the surface of the case 10 on the housing 40 side, a joining portion 22 to be joined with the housing 40 is provided. When viewed from the housing 40, the joining portion 22 is formed annularly. On the joining portion 22, bolt holes 22a (second fastening point) are formed. The plurality of bolt holes 22a are provided at intervals in the circumferential direction. A bolt 92 (see FIG. 1) penetrating the peripheral portion 45 of the housing 40 is screwed into each of the bolt holes 21a.

The housing 40 is fixed to the joining portion 22 with the bolts 92. Inside the housing 40, the torque converter 111 (see FIG. 1) is housed.

As shown in FIG. 2A, when viewed from the housing 40, inside of the annular joining portion 22, the oil pump 180 is provided between the through hole 13a and the through hole 16a, and below the through holes 13a and 16a.

In the case 10, the oil pump 180 is positioned close to a region positioned below the joining portion 22 in the vertical direction (vertical direction in FIG. 2A) based on the installed state of the continuously variable transmission 200.

The oil pump 180 is a mechanical oil pump driven by the rotational driving force of the engine, not shown. The rotational driving force of the engine is input to the oil pump 180 via a chain (not shown) of a driving force transmission mechanism (not shown). The oil pump 180 is driven by the input rotational driving force to suck/pressurize oil in an oil pan (not shown) fixed to the lower portion of the case 10 and to provide an oil pressure for the operation of the continuously variable transmission 200 to an oil pressure control circuit (not shown).

The oil pump 180 is one of the sources of vibration and noise in the continuously variable transmission 200.

Figure 5A:
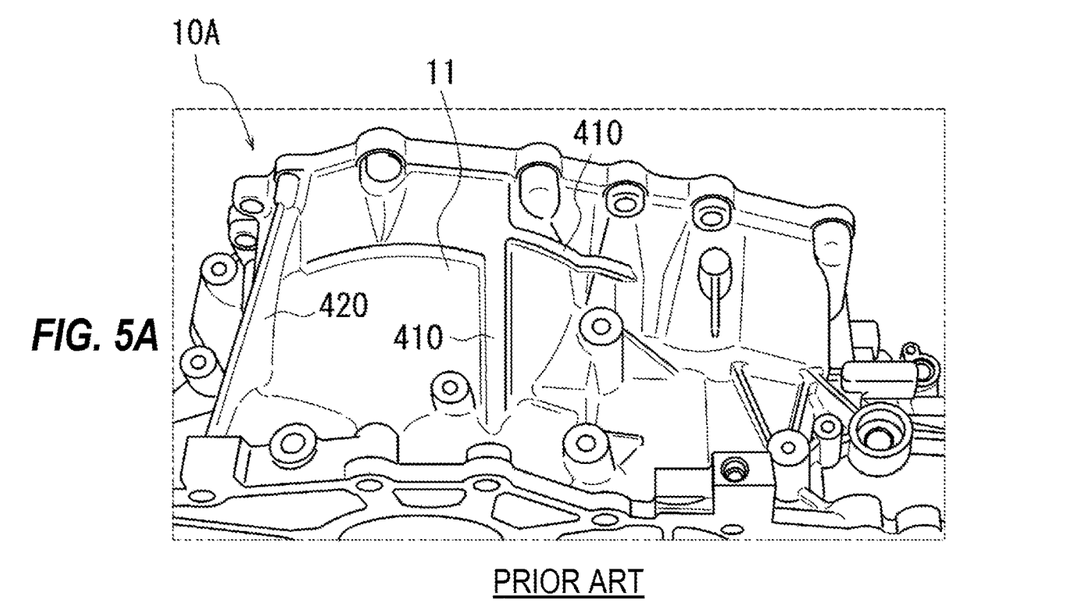
FIGS. 5A-5C are diagrams illustrating the case according to a conventional example viewed from diagonally from above.
Figures 5B, 5C:
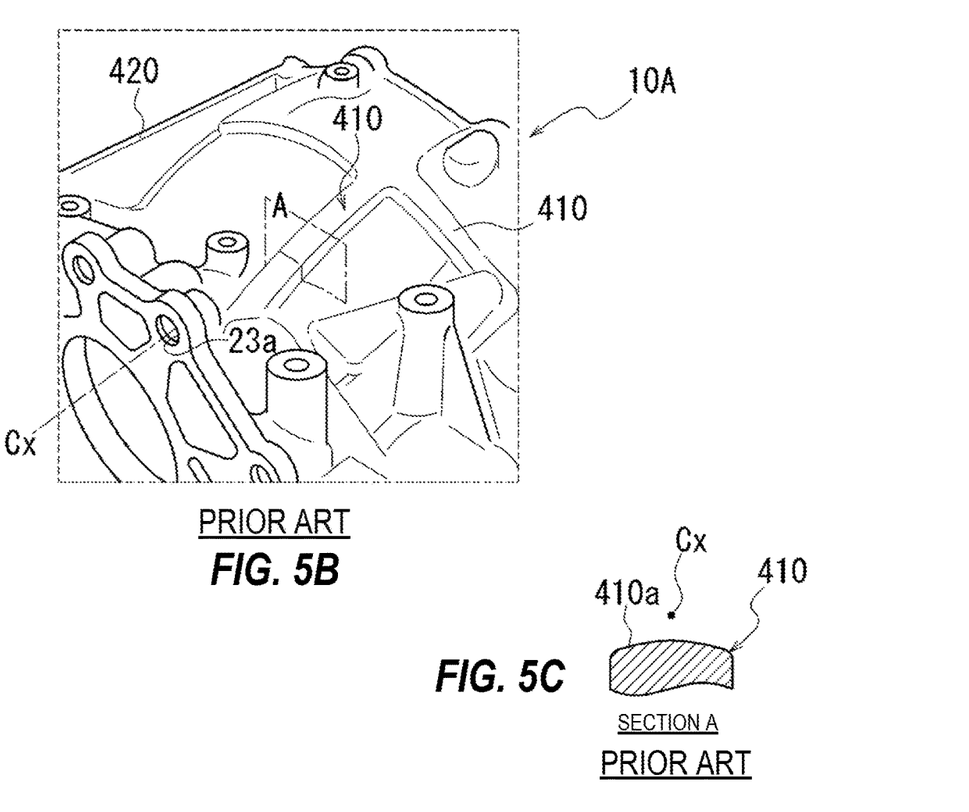

As shown in FIGS. 5A, 5B, in the conventional case 10A, a reinforcement rib 420 for ensuring the strength against vibration, and a noise/vibration suppressing rib 410 for suppressing noise and vibration are provided on the outer circumference wall portion 11 of the case 10A.

The reinforcement rib 420 and the noise/vibration suppressing rib 410 are solid portion with a plate shape or belt shape. The reinforcement rib 420 and the noise/vibration suppressing rib 410 are formed integrally with the case 10A when casting the case 10A.

In the case 10A, the reinforcement rib 420 and the noise/vibration suppressing rib 410 are formed independently of each other.

In contrast, as shown in FIGS. 3 and 4A, in the case 10 according to the present embodiment, the axial rib 25 having the function of the reinforcement rib and the function of the noise/vibration suppressing rib is provided together with the conventional reinforcement rib 420.

Like the reinforcement rib 420, the case 10 is provided with a bulging portion such that the axial rib 25 bulges outward of the case 10 from the surface of the outer circumference wall portion 11 of the case 10. The axial rib 25 is formed integrally with the case 10.

Hereinafter, the arrangement of the axial rib 25 in the case 10 and the configuration of the axial rib 25 will be described.

As shown in FIG. 2A, in the case 10, the oil pump 180 is positioned below the through hole 14a in the vertical direction (vertical direction in FIG. 2A) based on the installed state of the continuously variable transmission 200).

The oil pump 180 is positioned on a straight line VL in the vertical direction passing through the center (axis line X2) of the through hole 14a. A support wall portion 14 surrounding the through hole 14a is positioned above the oil pump 180.

As shown in FIG. 1, in the support wall portion 14, the fixed pulley 141 of the secondary pulley 140 is rotatably supported. In the support wall portion 15 adjacent to the support wall portion 14, the reduction gear 161 is rotatably supported.

As described above, the gear 163 of the reduction gear 161 side meshes with the gear 147 of the secondary pulley 140 side rotatably.

When the rotation is transmitted between the reduction gear 161 and the secondary pulley 140, a meshing reaction force acts on the gear 147 and the gear 163 in a direction to displace the gear 147 and the gear 163 in a direction away from each other (direction to separate)

A stress according to the meshing reaction force between the gear 163 and the gear 147 acts on the support wall portion 14 and the support wall portion 15. Therefore, in the case 10, a stress according to the meshing reaction force acts on a region around the support wall portion 14 and a region around the support wall portion 15 (see FIG. 2B).

Here, the region around the support wall portion 14 in the case 10 is divided into a first region, a second region, a third region, and a fourth region and the direction in which the stress corresponding to the meshing reaction force acts is defined.

The first region, the second region, the third region, and the fourth region are defined using a line segment L1 connecting the center (axis line X2) of one gear 147 and the center (axis line X3) of the other gear 163 and a line segment L2 passing through the center (axis line X2) of one of the pair of gears (gear 147) and perpendicular to line segment L1, as shown in FIGS. 2A and 2B.

Experimental and simulated stress analyses show that the effect of the meshing reaction force is greater for the first region and the third region than for the second region and the fourth region. The first region and the third region are two regions positioned closer to the joining portion 22 than the line segment L1.

The effect of the meshing reaction force is greater in the region (third region) around the support wall portion 14 than in the region (first region) around the support wall portion 15.

Therefore, in the case 10, a plurality of circumferential direction ribs 26 are connected to the outer periphery region of the support wall portion 14 facing the joining portion 22 (in the figure, the upper region).

The circumferential direction rib 26 is provided across the support wall portion 14 and the joining portion 22. A plurality of circumferential direction ribs 26 are provided at intervals in the circumferential direction about the axis line X2.

The rigidity and strength around the support wall portion 14 in the case 10 is increased by the plurality of circumferential direction ribs 26.

In addition, in the case 10, the effect of the meshing reaction force and the effect of vibration and noise act on the region corresponding to the third region described above of the outer circumference wall portion 11 positioned on the upper side when viewed from the oil pump 180 in the vertical direction based on the installed state of the continuously variable transmission 200 (see hatched region in FIG. 2B).

Therefore, in the case 10, in the outer periphery of the region corresponding to the third region in the outer circumference wall portion 11, the axial rib 25 for increasing the rigidity and strength is provided.

As shown in FIG. 3, on the outer surface of the outer circumference wall portion 11, at a position generally above the support wall portion 14, the axial rib 25 is provided. The position where the axial rib 25 is provided is a position where the meshing reaction force of gear 147 and the gear 163 (a pair of gears) can be suppressed.

When viewed from the circumferential direction around the axis line X2 which passes through the centre of the support wall portion 14, the axial rib 25 is provided linearly in a direction along the axis line X2.

When viewed from the circumferential direction around the axis line X2, the axial rib 25 is provided across the outer circumference wall portion 11 from the part on the housing 40 side to the part on the side cover 30 side.

The axial rib 25 is provided across the bolt hole 22a provided in the joining portion 22 on the housing 40 side and the bolt hole 21a provided in the joining portion 21 on the side cover 30 side (see FIGS. 4A, 4C).

In the axial rib 25, a communication hole 25a (hollow portion) communicating the bolt hole 21a (first fastening point) and the bolt hole 22a (second fastening point) is formed. The communication hole 25a is formed along the center line Cx connecting the center point of the bolt hole 21a and the center point of the bolt hole 22a.

The axial rib 25 is formed in a form that connects both of the bolt hole 21a and the bolt hole 22a. The outer peripheral surface 251 (top surface) of the axial rib 25 is positioned at a position higher than the center line Cx (position away from the surface of the outer circumference wall portion 11 of the transmission case 1) (see FIGS. 4D, 4E).

As shown in FIG. 2B, the axial rib 25 is provided in the region (third region) on which the meshing reaction force acts, and is provided at a position having the same phase angle in the circumferential direction around the axis line X2 as the circumferential direction rib 26 when viewed from the axis line X2 direction.

Thus, when viewed from the axis line X2 direction, the axial rib 25 and the circumferential direction rib 26 are positioned on the line segment R which shows the same phase angle position.

In the case 10, the axial rib 25 and the circumferential direction rib 26 form a single continuous bending rib. The synergistic effect of the axial rib 25 and the circumferential direction rib 26 further increases the rigidity and strength around the support wall portion 14 in the case 10.

The region corresponding to the third region in the outer circumference wall portion 11 of the case 10 is positioned above the oil pump 180 and, as described above, the position is a position affected by vibration and noise of the oil pump 180.

In the conventional case 10A, only the solid noise/vibration suppressing rib 410 is provided in this region. In this embodiment, by providing the hollow portion in the axial rib 25, the axial rib 25 has a function of the reinforcement rib and the noise/vibration suppressing rib.

Specifically, as shown in FIGS. 4A, 4C, in the axial rib 25, the communication hole 25a (hollow portion) communicating the bolt hole 21a and the bolt hole 22a is formed.

The hollow portion suppresses the propagation of vibration and noise to prevent vibration and noise from being emitted to the outside of the case 10.

Further, in the case 10, the bolt hole 21a of the joining portion 21 on the side cover 30 side, the bolt hole 22a of the joining portion 22 on the housing 40 side, and the communication hole 25a in the axial rib 25 are positioned so that the bolt hole 21a, the bolt hole 22a, and the communication hole 25a communicate in series.

Therefore, when the side cover 30 and the housing 40 are fixed to the case 10 with bolts 91 and 92, fastening pressure of the bolts 91 and 92 acts on the part of the axial rib 25. This ensures the rigidity strength of the hollow axial rib 25.

FIGS. 5A, 5B are diagrams illustrating the case 10A of the conventional example. FIG. 5A is a perspective view of the case 10A as viewed obliquely from above. FIG. 5B is an enlarged view of a main part in FIG. 5A. FIG. 5C is a diagram schematically showing the periphery of rib 410 cut by a plane A shown in FIG. 5B.

Here, the difference between the axial rib 25 of FIGS. 4A-4E (hereinafter, simply referred to as "rib 25") and the rib 410 of FIGS. 5A-5C will be described in detail.

The rib 410 of FIGS. 5A-5C is a noise/vibration suppressing rib and has a thin, flat configuration to provide the ability to divide flat, drum-like surfaces while saving cost and material.

On the other hand, the rib 25 in FIGS. 4A-4E is expected to have the reinforcement rib function in addition to the noise/vibration suppressing rib function.

To improve the function as the reinforcement rib, it is effective to increase the longitudinal section factor by making the shape thicker in the longitudinal direction.

Therefore, the rib 410 of FIGS. 5A-5C has a thin configuration in which the uppermost surface (outer peripheral surface 410a) is positioned at least at a position lower than the center line Cx passing through the center point of fixing holes (bolt holes 23a).

In contrast, the rib 25 of FIGS. 4A-4E has a thick shape such that the top surface (outer peripheral surface 251) is positioned at a position at least higher than the center line Cx connecting the center points of the fixing holes (bolt holes 21a, 22a). As a result, in addition to the function of the noise/vibration suppressing rib, the function as the reinforcement rib is added to the rib 25.

In order to further enhance the function as the reinforcement rib, in FIGS. 4A-4E, the top surface of rib 25 (outer peripheral surface 251) is positioned at a position higher than the uppermost point Px of the fixing hole (bolt holes 21a, 22a) which is higher than the center point of the fixing hole (center line connecting the center points of the bolt holes 21a, 22a).

By thickening of the rib, the material used for a single rib increases. However, because a reinforcement rib provided elsewhere can be omitted, the material as a whole can be reduced.

Such that the rib 25 of FIGS. 4A-4E, which functions as the noise/vibration suppressing rib and the reinforcement rib, connects the first fastening point (bolt hole 21a) and the second fastening point (bolt hole 22a) with shorter distance (preferably shortest distance) and the rib 25 is positioned at a position where the meshing reaction force of the pair of gears is suppressed, the position of each fastening point is shifted from FIGS. 5A-5C and positioned at a position of the outer wall surface of the third case member (case 10) adjacent to the third region.

By connecting the first fastening point and the second fastening point with shorter distance (preferably by the shortest distance), the material used can be saved.

The continuously variable transmission 200 according to the present embodiment has the following configuration.

(1) The continuously variable transmission 200 includes the case (transmission case 1) having the first case member (side cover 30), the second case member (housing 40) and the third case member (case 10) sandwiched between the first case member and the second case member, the oil pump 180 disposed in the case 10, and the pair of gears (gear 147, gear 163) disposed in the case 10.

The axial rib 25 (rib) having the linear shape extending from the side cover 30 toward the housing 40 is formed on the outer circumference wall portion 11 (outer wall surface) of the case 10 at the position adjacent to the pair of gears (gear 147, gear 163).

The axial rib 25 is disposed in the region on the straight line VL extending from the oil pump 180 in the vertical direction, and is locally disposed at the position where the meshing reaction force of the pair of gears is suppressed (gear 147, gear 163).

The axial rib 25 has the shape connecting both of the first fastening point (bolt hole 21a) between the first case member (side cover 30) and the third case member (case 10) and the second fastening point (bolt hole 22a) between the second case member (housing 40) and the third case member (case 10).

The outer peripheral surface 251 (top surface) of the axial rib 25 is positioned at the position higher than the center line Cx (position away from the surface of the outer circumference wall portion 11 of the transmission case 1).

With this configuration, by locally arranging the axial rib 25 at the required position, there is no need to provide ribs over the entire surface of the outer wall surface of the case 10 and it is possible to realize a non-grid rib. Therefore, the weight increase due to additional ribs can be suppressed, and weight reduction can be achieved.

Further, since the local axial rib 25 has the noise/vibration suppressing function and the strength improving function, as shown in FIGS. 5A, 5B, the number of ribs can be reduced as compared with a case where the noise/vibration suppressing rib 410 for noise/vibration suppression and the reinforcement rib 420 for strength improvement provided separately. This allows further weight reduction.

In the region just above the oil pump 180 in the case 10, radiation sound, such as an oil pump noise is generated. To suppress vibration due to this radiation sound, the axial rib 25 is formed on the straight line extending from the oil pump in the vertical direction and formed in the shape (linear shape extending from the side cover 30 toward the housing) which divides the flat area of the outer wall surface of the case 10 (third case). Thus, the axial rib 25 has the noise/vibration suppressing function.

The meshing of the pair of gears (gear 147, gear 163) produces the reaction force. Since the axial rib 25 is provided at the position where the reaction force is suppressed, the axial rib 25 has the strength improving function.

Thus, by forming the axial rib 25 locally at the position which achieves noise/vibration suppression as well as reinforcement, it is possible to suppress the weight increase due to the addition of rib.

Here, the fastening points (first fastening point, second fastening point) are positions (points) at which the case 10, the side cover 30, and the housing 40 are joined together by fastening members (screws, bolts, etc.).

By configuring as described above and connecting the two fastening points (bolt hole 21a, bolt hole 22a) by the axial rib 25, one end of the axial rib 25 is fixed to one of the fastening points (bolt hole 21a), and the other end of the axial rib 25 is fixed to the other one of the fastening points (bolt hole 22a). Thus, it is possible to enhance the strength improving function of the axial rib 25.

The continuously variable transmission 200 according to the present embodiment has the following configuration.

(2) When the region around the pair of gears (gear 147, gear 163) in the case 10 is divided into the first region, the second region, the third region and the fourth region to define the position where the meshing reaction force is suppressed, the position where the meshing reaction force is suppressed is the position of the outer circumference wall portion 11 (outer wall surface) of the case 10 adjacent to the third region.

The first region, the second region, the third region and the fourth region are defined by using the line segment L1 connecting the center (axis line X2) of one (gear 147) of the pair of gears and the center (axis line X3) of the other (gear 163) of the pair of gears and the line segment L2 passing through the center (axis line X2) of the one (gear 147) of the pair of gears and perpendicular to the line segment L1, as shown in FIGS. 2A, 2B.

The first region is the region positioned in front (output side of driving force) when viewed from the meshing position of the pair of gears (gear 147, gear 163) and in front (the side closer to the outer circumference wall portion 11) when viewed from the outer wall surface (outer circumference wall portion 11).

The second region is the region which is in front (output side of driving force) when viewed from the meshing position of the pair of gears (gear 147, gear 163) and is positioned in back (the side farther from the outer circumference wall portion 11) when viewed from the outer wall surface (outer circumference wall portion 11).

The third region is the region which is positioned in back (input side of driving force) when viewed from the meshing position of the pair of gears (gear 147, gear 163) and in front (the side closer to the outer circumference wall portion 11) when viewed from the outer wall surface (outer circumference wall portion 11).

The fourth region is the region positioned in back (the input side of driving force) when viewed from the meshing position of the pair of gears (gear 147, gear 163), and positioned in back (the side farther from the outer circumference wall portion 11) when viewed from the outer wall surface (outer circumference wall portion 11).

With this configuration, the axial rib 25 is locally disposed in the third region, which is the position where the meshing reaction force is suppressed.

Thus, while preventing an increase in the weight of the case 10, it is possible to secure the rigidity strength around the outer circumference wall portion 11 in the case 10 and to suppress the radiation sound caused by vibration and noise.

The continuously variable transmission 200 according to the present embodiment has the following configuration.

(3) The first fastening point and the second fastening point are arranged at the outer circumference wall portion 11 (outer wall surface) of the case 10 (third case member) adjacent to the region (third region) on which the meshing reaction force acts.

With this configuration, the axial rib 25 connected to both of the first fastening point (bolt hole 21a) and the second fastening point (bolt hole 22a) and the circumferential direction rib 26 are provided in the positional relation in which the phase angles in the circumferential direction around the axis line X2 coincide with each other.

Thus, in the case 10, the axial rib 25 and the circumferential direction rib 26 form the single continuous bending rib. With the synergistic effect of the axial rib 25 and the circumferential direction rib 26, the rigidity strength around the support wall portion 14 in the case 10 is further enhanced.

The continuously variable transmission 200 according to the present embodiment has the following configuration.

(4) The axial rib 25 has the hollow portion (communication hole 25a).

With this configuration, by providing the axial rib 25 with the hollow portion in which the metal of the fixing member or the case does not exist, it is possible to enhance the vibration and noise suppressing effect by the effect of hollow portion. This is due to the effect that the presence of an air space makes it difficult for sound to be transmitted.

The hollow portion can be formed by, for example, forming the bolt hole (screw hole) a little deeper to form the hollow portion, or by forming the hollow portion that penetrates the two bolt holes. The way to form the hollow portion is not limited only to these methods.

The continuously variable transmission 200 according to the present embodiment has the following configuration.

(5) The hollow portion (communication hole 25*a*) is constituted by the through hole connecting the first fastening point (bolt hole 21*a*) and the second fastening point (bolt hole 22*a*).

With this configuration, the volume of the hollow portion, i.e., the volume of the air space is increased by penetrating, thereby enhancing the vibration and noise suppressing effect.

The continuously variable transmission 200 according to the present embodiment has the following configuration.

(6) The third case member (case 10) includes the circumferential direction rib 26 connecting the support portion (support wall portion 14) supporting one (gear 147) of the pair of gears and the peripheral wall portion (outer circumferential wall portion).

With this configuration, since the circumferential direction rib 26 is connected to the support wall portion 14 and the outer circumference wall portion 11, the support wall portion 14 is easily positioned with respect to the outer circumference wall portion 11. This allows the gear 147 to be supported well because the rigidity of the support wall portion 14 increases.

In the above embodiment, the case where the driving force transmission apparatus is the automatic transmission for the vehicle is described as an example. The driving force transmission apparatus according to the present invention is not limited to the automatic transmission for the vehicle only.

The invention can be applied to an apparatus with a configuration in which in a gear train including a plurality of gears, at least one of the gears scrapes up the oil inside a case containing the gear train. An example of such an apparatus includes a decelerator that outputs a decelerated input rotation.

While the embodiments of the present invention have been described above, the present invention is not limited to aspects shown in these embodiments. Changes and modifications can be made appropriately within the scope of the technical ideas of the present invention.

The present application claims a priority of Japanese Patent Application No. 2018-32079 filed with the Japan Patent Office on Feb. 26, 2018 all the contents of which are hereby incorporated by reference.

What is claimed is:

1. A driving force transmission apparatus comprises:
a case having a first case member, a second case member and a third case member sandwiched between the first case member and the second case member,
an oil pump disposed in the case, and
a pair of gears disposed in the case, wherein
a rib extending from the first case member toward the second case member is formed on an outer wall surface of the third case member at a position adjacent to the pair of gears,
the rib is disposed above the oil pump and is disposed in a region where a meshing reaction force of the pair of gears is reduced,
the rib is disposed to connect both of a first fastening point between the first case member and the third case member and a second fastening point between the second case member and the third case member, and
a top surface of the rib is positioned at a position higher than a center point of a fixing hole at the first fastening point and a center point of a fixing hole at the second fastening point.

2. The driving force transmission apparatus according to claim 1, wherein
the pair of gears is divided into a first region, a second region, a third region and a fourth region by an inter-axis line connecting a center of one gear of the pair of gears and a center of the other gear of the pair of gears and a perpendicular line passing through the center of the one gear of the pair of gears and perpendicular to the inter-axis line,
the first region is a region which is in front when viewed from a meshing position of the pair of gears and in front when viewed from the outer wall surface,
the second region is a region which is in front when viewed from the meshing position of the pair of gears and in back when viewed from the outer wall surface,
the third region is a region which is in back when viewed from the meshing position of the pair of gears and is in front when viewed from the outer wall surface,
the fourth region is a region which is in back when viewed from the meshing position of the pair of gears and in back when viewed from the outer wall surface, and
the position where the meshing reaction force is suppressed is a position at the outer wall surface of the third case member adjacent to the third region.

3. The driving force transmission apparatus according to claim 2, wherein
the first fastening point and the second fastening point are disposed on the outer wall surface of the third case member at a position adjacent the third region.

4. The driving force transmission apparatus according to claim 3, wherein
the rib has a hollow portion.

5. The driving force transmission apparatus according to claim 4, wherein
the hollow portion is constituted by a through hole connecting the first fastening point and the second fastening point.

6. The driving force transmission apparatus according to claim 3, wherein
the third case member includes a rib connecting a support portion supporting the one gear of the pair of gears and a peripheral wall portion of the support portion.

7. A driving force transmission apparatus comprising:
a case having a first case member, a second case member, and a third case member sandwiched between the first case member and the second case member,
an oil pump disposed in the case, and
a pair of gears disposed in the case, wherein
a bulging portion bulging outward and extending along a direction extending from the first case member toward the second case member is formed on an outer wall surface of the third case member above the pair of gears,
the bulging portion of the outer wall surface of the third case member is disposed directly above the oil pump,
the bulging portion of the outer wall surface of the third case member is disposed above the pair of gears, and the bulging portion of the outer wall surface of the third case member is disposed on an input side to which driving force is inputted into one of the pair of gears when viewed from a meshing position of the pair of gears.

8. The driving force transmission apparatus as defined in claim 7, wherein
the bulging portion has a hollow portion.

9. The driving force transmission apparatus as defined in claim 8, wherein
a length of the hollow portion in an axial direction is longer than a length of a part of a bolt, the part of the bolt being inserted into the third case member.

10. The driving force transmission apparatus as defined in claim 7, wherein
a center of the other one of the pair of gears is offset from a vertical line passing through a center of the one of the pair of gears.

11. The driving force transmission apparatus as defined in claim 7, wherein
the oil pump and the pair of gears are disposed inside the third case member.

\* \* \* \* \*